United States Patent [19]

Muramatsu

[11] Patent Number: 4,615,022

[45] Date of Patent: Sep. 30, 1986

[54] SYMMETRICALLY-SUSPENDED VERTICAL-SWING LONG-PERIOD PENDULUM MEANS

[75] Inventor: Ikuei Muramatsu, Gifu, Japan

[73] Assignee: Gifu University, Gifu, Japan

[21] Appl. No.: 712,777

[22] Filed: Mar. 18, 1985

[30] Foreign Application Priority Data

May 19, 1984 [JP] Japan .................................. 59-99702

[51] Int. Cl.⁴ ........................ G01C 9/12; G01V 1/16; H04R 15/00
[52] U.S. Cl. .................................. 367/179; 33/1 HH; 33/391; 73/652; 181/122
[58] Field of Search ............... 181/101, 108, 110, 112, 181/122; 367/140, 178, 179, 182, 184; 73/382 R, 382 G, 652; 33/1 H, 1 HH, 391, 398, 399; 346/7

[56] References Cited

U.S. PATENT DOCUMENTS

| 1,652,255 | 12/1927 | Schweydar | 73/382 G |
| 1,923,088 | 8/1933 | Hayes | 367/184 |
| 2,576,775 | 11/1951 | Case | 367/179 |
| 2,706,401 | 4/1955 | Spaulding | 367/178 |
| 3,212,057 | 10/1965 | Romberg | 367/184 |
| 3,243,772 | 3/1966 | Perkins, Jr. | 367/178 |
| 4,117,496 | 9/1978 | Sattaripour | 346/7 |

FOREIGN PATENT DOCUMENTS 138774 12/1978 Japan .

Primary Examiner—Charles T. Jordan
Assistant Examiner—Brian S. Steinberger
Attorney, Agent, or Firm—Spencer & Frank

[57] ABSTRACT

Two sector-shaped pendulums are supported by crossed leaf springs at two axes on the same horizontal level respectively in a symmetrical manner so that each pendulum can swing about the axis thereof, sector-shaped surfaces of the pendulums being connected to each other by mutually-crossing flexible wires, each pendulum having a movable weight and a rigid extension so that a coiled spring connects the rigid extensions of the two pendulums, and each pendulum has a means for adjusting the center of gravity thereof by moving said weight and for adjusting the location of joints of said coiled spring.

1 Claim, 5 Drawing Figures

SYMMETRICALLY-SUSPENDED VERTICAL-SWING LONG-PERIOD PENDULUM MEANS

BACKGROUND OF THE INVENTION

1. Field of the Invention

This invention relates to a vertical-swing pendulum means suitable for vibration measurement in seismology and aseismic engineering, and more particularly to a vertical-swing pendulum means having a stable and accurate response to long-period components of seismic vibration.

2. Description of the Prior Art

Generally speaking, pendulum means with a long natural period in the order of several seconds to several tens of seconds has been used in seismology as an instrument for accurate measurement of seismic oscillation, and such pendulum means has played an important role in the study of the internal structure of the earth and the seismic source process. To facilitate such studies, various contrivances have been made heretofore in producing comparatively small pendulums having a sufficiently long natural period. In case of vertical-swing pendulums, special consideration is necessary in suspending the weight of the pendulum itself. Typical conventional methods for suspending vertical swing pendulums are the one devised by Sir J. A. Ewing (to be referred to as the Ewing type suspension, hereinafter) and the one devised by Lucian LaCoste (to be referred to as the LaCoste type suspension hereinafter).

In General, the neighorhood of the seismic source of a large-scale earthquake is exposed to strong ground vibration and considerable damage are caused there. When such largescale earthquake occurred, most of conventional pendulums with a long natural period scaled out or fell instable, so that satisfactory measurement could not be obtained by the long-period pendulums. Accordingly, in the aseismic engineering, the so-called acceleration meter type strong-motion seismograph with a very short natural period of shorter than 0.1 second has been developed, and such seismograph is used throughout the world at the present.

Many strong seismic oscillations have a maximum acceleration with period components of about one second or shorter, so that the currently used above acceleration type strong-motion seismograph can measure such short-period components of the seismic oscillations fairly accurately. However, the acceleration type seismograph has a shortcoming in that its accuracy in measuring long-period components of seismic oscillations is low.

On the other hand, there is a pressing need for accurate measurement and recording of long-period components in strong seismic oscillations, because structures with long natural periods of oscillation such as super-high-rise buildings and large-scale oil tanks have increased recently. To meet such need, a number of improvements have been proposed in the strong-motion seismograph. For instance, the inventors have developed an improved "velocity type strong-motion seismograph" and disclosed it in their Japanese Patent Laying-open Publication No. 138,774/78.

The essence of the inventors' improved velocity type strong-motion seismograph was in a structure including two horizontally disposed symmetrical pendulums which are connected to each other by mutually-crossing flexible wires. In the last mentioned structure, forces in directions different from the movable direction of the pendulums are cancelled, so that such structure provides a small size pendulum means having a comparatively long natural period of oscillation and being stable against strong seismic vibration.

It is noted that a horizontal-swing pendulum means having two pendulums disposed one above the other and connected by mutually-crossing flexible wires was once proposed. However, in the vertical arrangement of the two pendulums, the lower-side pendulum or the inverted-side pendulum tends to be turned by its own weight about its axis of swing, and if the axis of swing is made by a leaf spring, the lower-side pendulum becomes instable, while if it is pivotally supported, the accuracy is considerably deteriorated by solid friction at the pivot. Accordingly, such vertical arrangement of two symmetrical pendulums has never been used in seismograph.

In the above-mentioned inventors' velocity type strong-motion seismograph, the horizontal arrangement of the two symmetrical pendulums connected to each other by mutually-crossing flexible wires avoids the difficulty of the lower-side pendulum of the vertical arrangement. In fact, the inventors' "velocity type strong-motion seismograph" has been used in actual field measurement by immersing the horizontally disposed symmetrical pendulums connected by mutually-crossing flexible wires in a highly viscous oil so as to apply a super damping to it, and a number of excellent seismic recordings have been obtained already by it, so that it has contributed to a new frontier in the study of prediction of strong ground motions.

However, as to the vertical component of the above velocity type strong motion seismograph the weights of the horizontally disposed two pendulums are suspended by the so-called Ewing type suspension as shown in FIG. 1. So that the natural period thereof was restricted to be about one second at the longest, and its accuracy was insufficient for the measurement of long-period seismic oscillation. Thus, there is a need for the development of a longer natural period of the pendulum means without sacrificing its stability, so as to expand the use of the pendulum means in the measurement of seismic ground vibrations.

SUMMARY OF THE INVENTION

Therefore, an object of the invention is to obviate the above-mentioned shortcoming of the prior art by providing a vertical-swing pendulum means having horizontally disposed two symmetrical pendulums connected to each other by mutually-crossing flexible wires, which pendulum means has a long natural period of up to about 5 seconds while maintaining a high stability, so as to improve the accuracy in the measurement and recording of the long-period components of seismic ground vibrations.

The object of achieving the natural period of about 5 seconds, which was available in the conventional horizontal-swing pendulum means with pendulums connected by mutually-crossing flexible wires, has been fulfilled by the inventors for vertical-swing pendulum means through the use of a novel arrangement of symmetrical suspension.

Once the horizontal-swing pendulum means and the vertical-swing pendulum means having the desired long natural periods are realized, a seismograph with the following excellent characteristics can be easily produced by adding a suitable damping resistance thereto.

(1) A unitary seismograph which can measure and record seismic vibration over a wide range, covering from a small amplitude oscillation to a large amplitude oscillation, from short-period components to long-period components. Such seismograph is expected to facilitate the study of infering the hardly recordable strong-motion of large earthquakes from easily recordable weak ground vibration of small earthquakes.

(2) A unitary seismograph having such a high accuracy of measurement in the long-period range that it can observe earthquakes on a global basis by recording ground vibrations caused by earthquakes in remote areas. Such improved seismograph may provide a strong supplement to or even a substitute of the conventional WWSSN (World Wide Standardized Seismograph Network), so as to further promote the study of earthquakes.

The symmetrically-suspended vertical-swing long-period pendulum means of the present invention has been developed by changing the Ewing type suspension of the inventors' previous vertical-swing pendulum means with horizontally-disposed symmetrical pendulums connected by mutually-crossing flexible wires to symmetrical suspension, and by finding out the conditions for producing a long natural period of oscillation in a symmetrically-suspended vertical-swing pendulum means through theoretical analysis of its dynamics, which conditions are fulfilled by making the center of gravity of each pendulum adjustable through a movable weight mounted thereon.

A preferred embodiment of the symmetrically-suspended vertical-swing long-period pendulum means according to the invention has a pedestal which symmetrically suspends two identical sector-shaped pendulums at horizontally aligned two axes in such a manner that the pendulums can swing vertically on substantially one common vertical plane about their axes of suspension respectively.

Each of the pendulums has a sector-shaped surface with its center of curvature located at its axis of rotation. The sector-shaped surfaces of the two pendulums are disposed so as to face each other and connected to each other by mutually-crossing flexible wires.

Each pendulum has a rigid extension integrally formed therewith so as to extend downward and a weight movably mounted thereon. A coiled spring connects the rigid extensions of the two pendulums symmetrically.

A first adjuster means is mounted on the pendulums so as to adjust the center of gravity of each pendulum by moving the weight thereof, while a second adjuster means is mounted on the rigid extensions of the pendulum so as to adjust the location of joints of the coiled spring. Whereby, the natural period of oscillation of the vertical-swing pendulum means is made long.

BRIEF DESCRIPTION OF THE DRAWINGS

For a better understanding of the invention, reference is made to the accompanying drawings, in which.

Throughout different views of the drawings, SP1 and SP2 are sector-shaped pendulums, TS1 and TS2 are flexible wires (piano wires), FR is a framework, CS is a coiled spring, M is the center of gravity of a pendulum with a weight mounted, M' is the center of gravity of a weight, A is a joint between the pendulum and the coiled spring, O is an axis about which the pendulum swings, 1 is a sector-shaped pendulum, 2 is a weight, 3 is a frame, 4 and 4' are setscrews, 5, 6 and 14 are slits, 7 is the center of gravity of a pendulum, 8 is a crossed leaf spring member, 9 is a pedestal, 10 is a coiled spring, 11 is an adjustable member, 12 is a piano wire, 13 and 15 are adjusting screws, 16 and 16' are flexible wires, 17 is a displacement-voltage converter, and 18 is a winding lead wire.

DESCRIPTION OF THE PREFERRED EMBODIMENTS

The invention will be described in detail now by referring to a preferred embodiment shown in the accompanying drawings.

Figure 2:
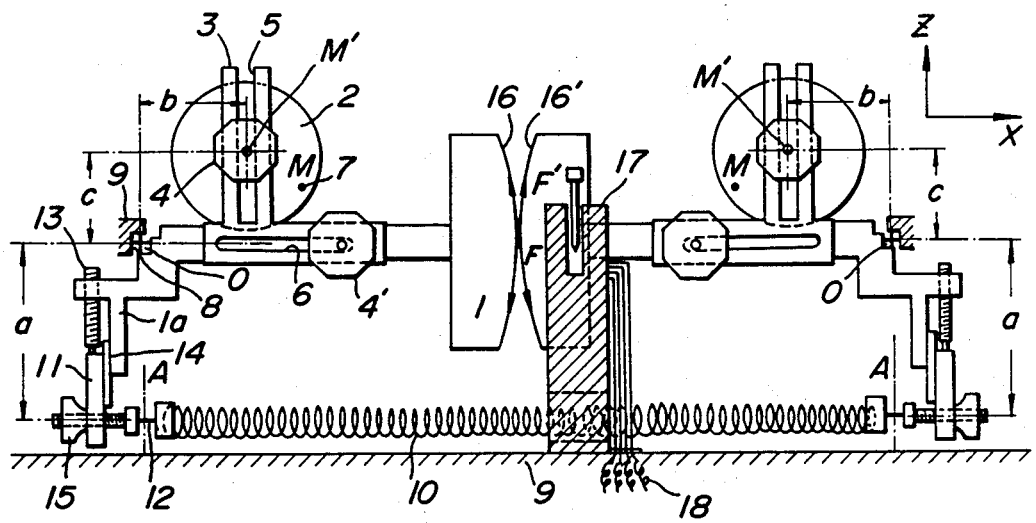
FIG. 2 is a schematic elevation of an embodiment of the symmetrically-suspended vertical-swing long-period pendulum means according to the present invention.

FIG. 2 shows detailed structure of a symmetrically suspended vertical-swing long-period pendulum means according to the invention. As shown in the figure, the structure of the invention is laterally symmetrical with respect to a central vertical plane, so that only the left-hand side half of the pendulum means will be expalined hereinafter, and the symbols and names of like parts are applicable to the right-hand half thereof.

In the illustrated embodiment, a sector-shaped pendulum 1 has a vertically disposed sector-shaped surface. A weight 2 is mounted on a frame 3 which is movably carried on the sector-shaped pendulum 1. The frame 3 has setscrews 4, 4' fitted in a vertical slit 5 and a horizontal slit 6 thereof respectively. The vertical position of the weight 2 relative to the sector-shaped pendulum 1 can be adjusted by moving the weight 2 along the vertical slit 5 of the frame 3 and the weight 2 can be fixed at a desired vertical position by fastening the setscrew 4. The horizontal position of the weight 2 relative the sector-shaped pendulum 1 can be also adjusted by moving the frame 3 along a horizontal arm of the pendulum 1. Both the weight 2 and the frame 3 can be fixed at a desired horizontal position relative to the pendulum 1 by fastening the setscrew 4'.

Thus, the position of the weight 2 relative to the pendulum 1 can be adjusted on a vertical plane. The center of gravity 7 of the sector-shaped pendulum 1 combined with thus positioned weight 2 falls at the illustrated position, and the net mass M of the pendulum 1 and the weight 2 can be assumed to be concentrated at the center of gravity 7.

A crossed leaf spring member 8 is made of mutually-crossing vertical leaf spring and horizontal leaf spring, and the sector-shaped pendulum 1 is suspended from a stationary portion of a pedestal 9 by the tension of such crossed leaf spring member 8. Thus, the crossing line O of the crossed leaf spring member 8 acts as a joint between the pendulum 1 and the pedestal 9 and also as the axis of rotation about which the pendulum 1 swings. The axis O intersects with the plane of FIG. 2 at right angles, and the point O of FIG. 2 shows the intersection of the axis and the plane of FIG. 2.

The pendulum 1 has a rigid extension 1a extending downward, and a coiled spring 10 connects such rigid extensions 1a of the two pendulums 1, as shown in FIG. 2. In the illustrated embodiment, the coiled spring 10 is connected to the tip portion of an adjustable member 11 through a short piano wire 12, and the adjustable member 11 is carried by the rigid extension 1a of the pendulum 1. In the succeeding description, the longitudinal central point A of the piano wire 12 between the facing edges of the coiled spring 10 and an adjusting screw 15 carried by the adjustable member 11 is assumed to be the joint betwen the pendulum 1 and the coiled spring 10. The adjustable member 11 is vertically slidable along a slit 14 of the rigid extension 1a of the pendulum 1 in response to the turning of an adjusting screw 13 meshing a threaded portion of the rigid extension 1a. Thus, the position of the joint A can be adjusted vertically by turning the adjusting screw 13 on the rigid extension 1a and horizontally by turning the adjusting screw 15 on the adjustable member 11.

The opposing sector-shaped surfaces of the two horizontally disposed pendulums 1 are connected to each other in a symmetrical manner by mutually-crossing flexible wires 16, 16'. The flexible wires 16, 16' are made of flexible but non-extensible wires such as piano wires. The function of the mutually-crossing flexible wires 16, 16' connecting the two sector-shaped pendulums 1 is the same as that of the conventional vertical-swing pendulum means of FIG. 1. More particularly, once the two pendulums 1 are thus connected, tensions F and F' are caused in the mutually-crossing flexible wires 16 and 16', and an orthogonal X-Z coordinates system with an origin at the axis O is defined, so that the coordinates of the joint A are given by $(\epsilon, -a)$ and the coordinates of the center of gravity M' of the weight 2 alone are given by (b, c).

The horizontal abscissa $\epsilon$ of the joint A can be made zero by turning the adjusting screw 15, while the vertical ordinate $-a$ of the joint A can be adjusted by turning the adjusting screw 13 so as to cause the adjustable member 11 to slide along the slit 14 of the rigid extension 1a. The coordinates (b, c) of the center of gravity M' of the weight 2 can be adjusted respectively by the slidable adjusting mechanism made of the frame 3, the setscrews 4, 4' and the slits 5, 6.

The two sector-shaped pendulums, 1, 1 thus assembled with the mutually-crossing flexible wires 16, 16' can be held at substantially horizontal positions by balancing the gravity acting on the pendulums 1, 1 against the tension of the coild spring 10. When a seismic vibration such as a large-scale earthquake oscillation is applied to the pendulum means thus assembled, the relative vertical movement of the sector-shaped pendulums 1, 1 can be detected by a displacement-voltage converter 17 and the output from such converter 17 can be brought to the outside through winding lead wires 18, so as to measure and record such seismic vibration. In FIG. 2, the shaped portions represent stationary members which are integral with the pedestal 9. In an actual model prepared by the inventors, the distance between the axes O, O of the two pendulums 1, 1 was 216 mm.

The operating principles of the symmetrically-suspended vertical-swing long-period pendulum means of the invention thus assembled will be described now.

Figure 3:
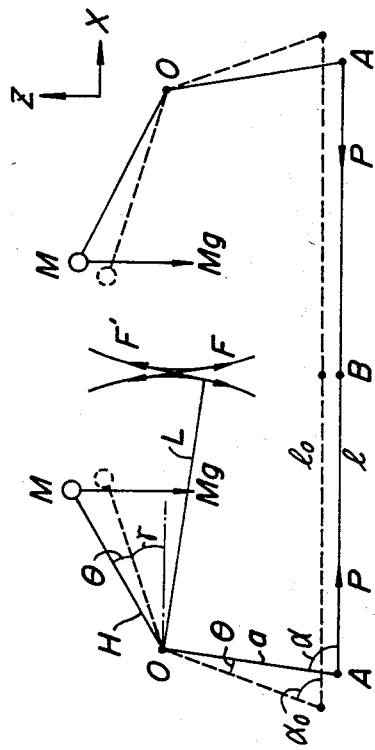
FIG. 3 is a diagrammatic illustration of the operative principle of the symmetrically-suspended vertical-swing long-period pendulum means of the invention.

The essential points in the formation of the symmetrically-suspended vertical-swing long-period pendulum means of the invention are in that the two pendulums 1, 1 are suspended in a completely symmetrical manner while balancing the weights of the pendulums 1, 1 connected by the flexible wires 16, 16' with the tension of the coiled spring 10 stretched horizontally, and in that of the position of the center of gravity 7 of the pendulum 1 is adjusted to a suitable position by moving the weight 2, whereby the natural period of the vertical-swing pendulum means is made long. FIG. 3 illustrates only such essential points, and the details of the operating principles of the invention will be described by referring to FIG. 3.

In FIG. 3, the dash lines represent the positions when the pendulums 1, 1 are at rest, and the solid lines represent the conditions when the pendulums 1, 1 are turned upward by an angle $\theta$. Since the perfect symmetry of the vertical-swing pendulum assembly is maintained even during the movement of the pendulums 1, 1, only the movement of the left-hand side half of the pendulum means will be described.

When a vertical acceleration z and a horizontal acceleration x are simultaneously applied to the left-hand side pendulum 1 in the vertical direction Z and the horizontal direction X, the motion equation of the left-hand side pendulum 1 can be given by $$I\ddot{\theta} = N \qquad (1)$$

$$N = Pa\sin\alpha - M(g-\ddot{z})H\cos(\gamma+\theta) - K\theta - R\dot{\theta} + R\ddot{x}H\sin(\gamma+\theta) + FL - FL \qquad (2)$$

Here,

I is an inertia moment of the pendulum,
$\theta$ is an angular displacement, positive in the counterclockwise direction,
N is a rotating force around the axis O,
P is a tension of the coiled spring, $P = \beta(l-l_i)$,
$\beta$ is a constant showing the strength of the coiled spring.
l is the length of the coiled spring at the angular displacement $\theta$ (when $\theta=0$, $l_o$),
$l_i$ is the initial length of the coiled spring,
a = OA is the distance between the axis O of rotation and the joint A of the coiled spring with the pendulum,
$\alpha = <$OAA (when $\theta=0$, $\alpha_o$),
M is the mass of the pendulum plus the weight and also represents the position of the center of gravity of the pendulum plus the weight in FIG. 3,
g is the gravitational attraction,
$\ddot{Z}$ is the seismic ground acceleration in the vertical Z direction,
H = OM is the distance between the axis of rotation O and the center of gravity M,
$\gamma$ is the angle of elevation <MOO of the center of gravity M at the balanced rest position,
$K\theta$ is the restoring force of the crossed leaf spring member 8 forming the axis O at the angular displacement $\theta$, $R\dot{\theta}$ is a viscous resistive force of, for instance oil in which the pendulum means is immersed, in proportion to the angular velocity $\dot{\theta}$, $\ddot{x}$ is the seismic acceleration in the horizontal X direction, F and F' are tensions applied to the left-hand side pendulum from the mutually-crossing flexible wires, and L is the distance from the axis O to the surface of the sector-shaped pendulum, namely the radius of curvature of the sector-shaped surface of the pendulum.

As to the restoring force of the pendulum, the bending stresses of the mutually-crossing flexible wires 16, 16' and the piano wire 12 forming the joint A exist, but such bending stress is negligible.

When the X direction component of the seismic acceleration $\ddot{x}$ acts to the right in FIG. 3, the inertia forces acting on the center of gravities M of the two pendulums are directed to the left, so that the forces F and F' applied from the right-hand side pendulum to the left-hand side pendulum through the mutually-crossing flexible wires are given by $$F = -M\ddot{x}H \sin(\gamma+\theta)/L, \quad F' = 0 \tag{}$$

When the X direction component of seismic acceleration x acts to the left, the inertia forces thereby is cancelled by the tension F' of one of the mutually-crossing flexible wires while the other tension F is zero. Thus, the sum of the last 3 terms right side of the equation (2) are always nil. In short, the horizontal seismic acceleration x does not produce any rotational force in the pendulums due to the presence of the mutually-crossing flexible wires connecting the two pendulums.

Besides, if the horizontal component of the seismic acceleration is nil, i.e. $\ddot{x}=0$, then the tensions on the mutually-crossing flexible wires become nil too, namely $F = F' = 0$. Thus, in the operating diagram of FIG. 3 and in the motion equations (1) and (2), it is sufficient to consider only the inertia forces due to the vertical seismic acceleration $\ddot{z}$.

The restoring force of the pendulums based on the above-mentioned equations under the conditions of free oscillation with no vertical acceleration $\ddot{z}$ will be considered now.

Referring to the equation (2) which gives the rotating force N acting on the left-hand side pendulum, if the last three terms to be cancelled by the connection with the mutually-crossing flexible wires are neglected, the sum $Q(\theta)$ of the first term representing the rotating force due to the tension of the coiled spring and the second term representing the rotating force due to the gravitation can be given by the following function of the angular displacement $\theta$.

$$Q(\theta) = (Pa) \sin\alpha - (MgH)\cos(\gamma+\theta) \tag{3}$$

In FIG. 2, if the displacement of the pendulum at the position of the differential transformer or the displacement-voltage converter 17 is assumed to be less than 1 mm, since the distance from the axis of rotation O to the displacement-voltage converter 17 is about 100 mm, the angular displacement $\theta$ is the following range.

$$\theta \leq (1\ mm/100\ mm) = 10^{-2} << 1 \tag{4}$$

With the magnitude of the angular displacement in mind, if the equation (3) is expanded by using the Taylor's series, the following equation (5) can be derived.

$$Q(\theta) = Q(O) + Q'(O)\cdot\theta + (\tfrac{1}{2})Q''(O)\cdot\theta^2 + (1/6)Q'''(O)\cdot\theta^3 + \tag{5}$$

The first term on the right side of the equation (5) is the value of $Q(\theta)$ under the rest conditions with $\theta=0$, so that condition of $$Q(O) = 0 \tag{6}$$

represents the condition for balancing the rotating force due to the gravitation with the rotating force due to the tension of the coiled spring.

The second term on the right side of the equation (5) has a value proportional to the angular displacement $\theta$, and this term represents the restoring force when its coefficient $Q'(O)$ is negative.

The third term on the right side of the equation (5) is proportional to $\theta^2$, so that this term represents a unidirectional force regardless of whether the angular displacement $\theta$ is positive or negative. Such unidirectional force is not desirable from the standpoint of accuracy in the operation of the pendulum. Thus, to make the coefficient $Q''(O)$ of the third term nil represents the condition for making the restoring force of the pendulum accurately proportional to the angular displacement $\theta$, so that $Q''(O) = 0$ may be called the linear condition.

The fourth and further terms on the right side of the equation (5) are also undesirable for the measuring pendulum, but the numerical value of each of such terms becomes less than $10^{-6}$ thanks to the relationship of the equation (4), so that they can be neglected.

It is noted that when the coefficient $Q'(O)$ is negative, the pendulum restores in a stable manner, but the smaller its value is, the smaller the restoring force will be and the longer the pendulum period will be. Accordingly, $Q'(O) = 0$ may be called the long-period condition.

In summary, the stability condition is $$Q'(O) < 0, \tag{7}$$

the long-period condition is $$Q'(O) = 0, \tag{8}$$

and the linear condition is $$Q''(O) = 0 \tag{9}$$

One of the outstanding features of the symmetrically-suspended vertical-swing long-period pendulum means according to the invention is in that the pendulum means can be constructed in such a manner that the conditions of the equations (6), (8), and (9) can be simultaneously fulfilled. In this case, the rotating force of the equation (2) is given by only the two terms $-K\theta - R\dot{\theta}$, and substitution of such conditions in the equation (1) results in the following equation (10) which represents the natural period To of the pendulum means.

$$T_o = 2\pi\sqrt{1/K} \tag{10}$$

Thus, the natural period To of the pendulum means can be made long in a reliable and stable manner by making the leaf springs of the crossed leaf spring member 8 thin, which member 8 suspends the pendulum means while defining the axis of rotation O.

The conditions of the equations (6), (8) and (9) will be described in more practical terms by referring to the operating diagram of FIG. 3.

During the operation of the pendulum means of the invention, the coiled spring 10 is always kept horizontal, so that the angle $<OAA=\alpha$ (when angular displacement $\theta=0$, $\alpha_o$) on the coiled spring 10 is given by the following equation relationship (11).

$$\alpha(\theta)=\alpha_o+\theta \tag{11}$$

Thus, the length l of the coiled spring 10 (when the angular displacement $\theta=0$, $l_o$) can be given by the following function of the angle $\theta$ by taking up to the $\theta^3$ term.

$$l(\theta)=l_o-2(a\cos\alpha_o-a\cos\alpha)=l_o-2a\sin\alpha_o\cdot\theta-a\cos\alpha_o\cdot\theta^2+(a/3)\sin\alpha_o\cdot\theta^3 \tag{12}$$

Accordingly, the tension $P(\theta)$ of the coiled spring is given by $$P(\theta)=\beta(l-l_i)\approx\beta(l_o-l_i)-2\beta a\sin\alpha_o\cdot\theta-\beta a\cos\alpha_o\cdot\theta^2+(\beta/3)a\sin\alpha_o\cdot\theta^3 \tag{13}$$

For simplicity of expression, the following substitution will be used hereinafter.

$$P(O)=\beta(l_o-l_i)=Po \tag{14}$$

The above equations (6), (8) and (9) for certain operating conditions can be rewritten by using the equations (11), (12), (13) and (14).

$$Q(O)=Poa\sin\alpha_o-Mgh\cos\gamma=0 \tag{6'}$$

$$Q'(O)=-2\beta a^2\sin\alpha_o+Poa\cos\alpha_o+Mgh\sin\gamma=0 \tag{8'}$$

$$Q''(O)=-6\beta a^2\cos\alpha_o\sin\alpha_o-Poa\sin\alpha_o+Mgh\cos\gamma=0 \tag{9'}$$

The balance condition equation (6) must be always fulfilled, and the substitution of the equation (6') in the equation (9') gives $$Q''(O)=-6\beta a^2\sin\alpha_o\cos\alpha_o=0,$$

and since $\beta a^2\sin\alpha_o\neq 0$, $\cos\alpha_o=0$. Hence, the equation (9') results in $$\alpha_o=90° \tag{15}$$

The above equation (15) is the linear condition in the pendulum device according to the invention.

The long period condition equation (8') can be simplified into the following equation (16) by using linear condition equation (15), the balance condition equation (6') and the equation (14).

$$Q'(O)=-2\beta a^2+MgH\sin\gamma=MgH\cos\gamma[\tan\gamma-2a/(l_o-l_i)] \tag{16}$$

Accordingly, the ling-period conditions becomes $$\tan\gamma=2a/(l_o-l_i) \tag{17}$$

Similarly, the following stability condition equation can be derived from the equation (16).

$$\tan\gamma<2a/(l_o-l_i) \tag{18}$$

In the embodiment of FIG. 2, the initial value $\alpha_o$ of the angle at the joint A between the coiled spring 10 and the pendulum 1 is fixed at 90°, and the balance condition of the equation (6') and the long period condition of the equation (17) can be fulfilled by adjusting the distance a between the axis of rotation O and the joint A of the coiled spring 10 with the pendulum 1, the distance H between the axis of rotation O and the center of gravity M, and the angle of elevation $\gamma$ of the center of gravity M. More particularly, there are three adjustable portions in fulfilling the conditions of the two equations, so that one of the three adjustable portions can be set at will. Thus, the adjustment is very easy. The availability of the one adjustable portion for arbitrary setting is advantageously utilized in making adjustment against buoyancy when the pendulum means of the invention is immersed in oil for making a seismograph.

Figure 1:
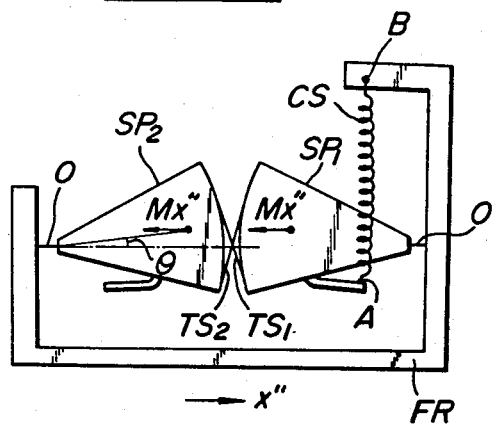
FIG. 1 is a schematic elevation of a conventional vertical-swing pendulum means having horizontally disposed symmetrical pendulums connected by mutually-crossing flexible wires, which pendulums are suspended by a fixed spring by using the Ewing type suspension.

The above-mentioned linear condition and long period condition of the symmetrically-suspended vertical-swing long-period pendulum means according to the invention will now be compared with linear condition and the long period condition of the Ewing type suspension with fixed spring as shown in FIG. 1 and those of the LaCoste type suspension which has been considered to be the best as the vertical-swing long-period pendulum means. More specifically, a triangle OAB in the conventional Ewing type suspension of FIG. 1, with corner at the axis of rotation O of the pendulum SP1, the joint A betweent the coiled spring CS and the pendulum SP1, and the joint B between the coiled spring CS and the frame FR, is compared with a triangle OAB is the pendulum means of FIG. 2 according to the invention, with corners at the axis of rotation O of the pendulum 1, the joint A between the coiled spring 10 and the pendulum 1, and the central point B of the coiled spring 10. In the case of the LaCoste type suspension, it has only one pendulum and a triangle similar to the above triangle OAB of the Ewing type suspension can be considered.

The symmetrical suspension of the present invention is characterized in that the central point B of the coiled spring is not fixed, and yet the central point B hardly moves if the initial value of the angle $<OAA$ is 90°, i.e. $\alpha_o=90°$.

As to the linear condition, the symmetrical-suspension of the present invention requires that the joint point angle $<OAA=\alpha_o=90°$, while the conventional Ewing type suspension requires that the joint angle is 90°, i.e., $<B=90°$, and the conventional LaCoste type suspension requires that the initial length of the coiled spring is zero, i.e., $l_i=0$.

As to the long period condition, the symmetrical-suspension of the invention requires a certain value of the angle of elevation, i.e., $\tan\gamma=2a/(l_o-l_i)$, and the Ewing type suspension requires that the joint point angle is zero, i.e., $<A=0°$ which is impossible to realize, and the LaCoste type suspension requires that the joint point angle $<0=90°$. In short, as to the triangle OAB, the symmetrical suspension of the invention has the linear condition of the joint point angle $<A=90°$, the Ewing type suspension has the linear condition of the joint point angle $<B=90°$, and the LaCoste type suspension has the long period condition of joint point angle $<0=90°$.

The characteristics and the performance of the symmetrically-suspended vertical-swing long-period pendulum means of the invention will now be described by referring to practical examples.

Figure 4:
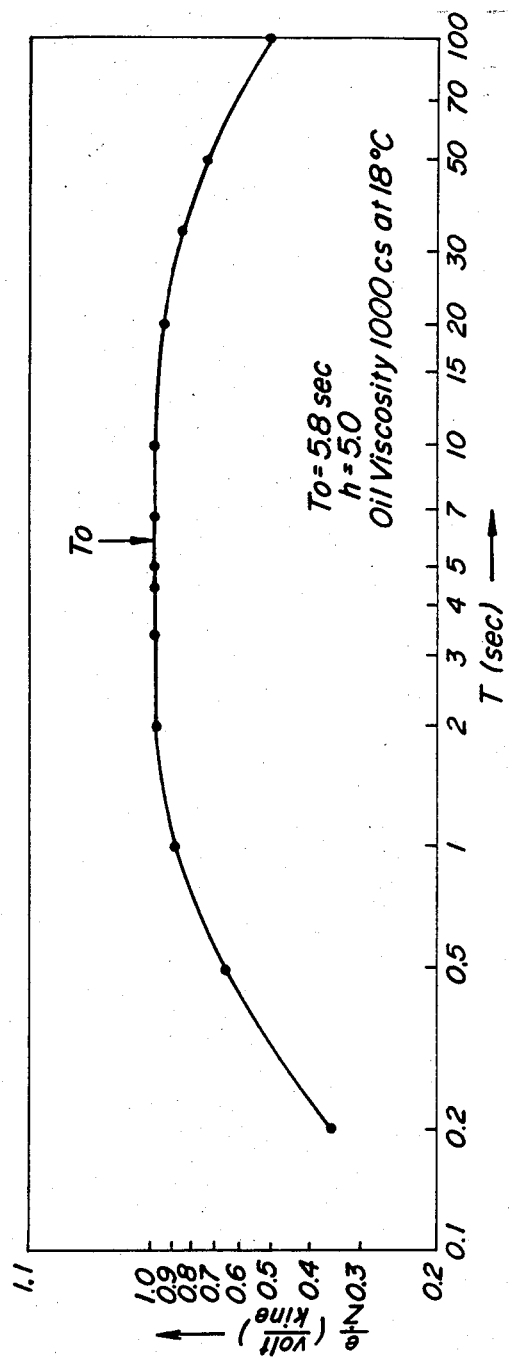
FIG. 4 is a graph showing the operating characteristics of an embodiment of the symmetrically-suspended vertical-swing long-period pendulum means of the invention.

With the structure of FIG. 2, when the crossed leaf spring member 8 for suspending the pendulum 1 and forming the axis of rotation O was made by using 0.07 mm thick beryllium leaf spring with a width of 5 mm, a natural period of 8 seconds was obtained. A natural period was set at 5.8 seconds by allowing a margin to the above value. The pendulum means was immersed and sealed in silicon oil with a viscosity of 1,000 cs. The sensitivity-period characteristics of the thus immersed pendulum means was measured, and the result is shown in FIG. 4. In the figure, the ordinate represents the ratio between the output voltage from the differential transformer or the displacement-voltage converter and the vibrating velocity of the pedestal, while the abscissa represents the period of the pedestal vibration.

In general, a vibrating table does not have a good accuracy over a wide range of period. Accordingly, in the case of the test run of FIG. 4, a sensitivity testing coil and a magnet were secured to the pedestal and the pendulum respectively, and the vibration was actuated by applying an oscillatory current from an oscillator. Thus, the value plotted on the ordinate of FIG. 4 was determined by converting the drivng current to the vibrating velocity of the pedestal. In the test result of the figure, the sensitivity curve was completely symmetrical on opposite sides of the natural period of 5.8 second, over a wide period range covering 0.2 second to 100 seconds, and the response characteristics was in good agreement with theoretical analysis.

In short, the symmetrically-suspended vertical-swing pendulum means of the invention with the structure of FIG. 2 proved to have good response characteristics relative to outside vibration with a high accuracy over a desired wide range of period. As to the mnimum amplitude of the pendulum vibration, the pendulum means is expected to correctly respond to the outside vibration until the pendulum displacement becomes as small as $10^{-6}$ mm. Such minimum amplitude may be proven by operating the pendulum means at a sufficiently quiet place.

The sensitivity characteristics of the pendulum means in case of the natural period of 2 seconds and the oil viscosity of 80,000 cs was calculated from the operating data of FIG. 4. The result shows that the pendulum means provides a velocity-meter with an attenuation constant of 160 and a flat sensitivity characteristics over a wide period range of 0.02 second to 200 seconds. The recordable seismic vibration will be from a maximum of 100 kine (kine=cm/sec) to a minimum of $10^{-4}$ kine. The limit of the earthquake vibration is considered to be about 100 kine, for the time being.

Figure 5:
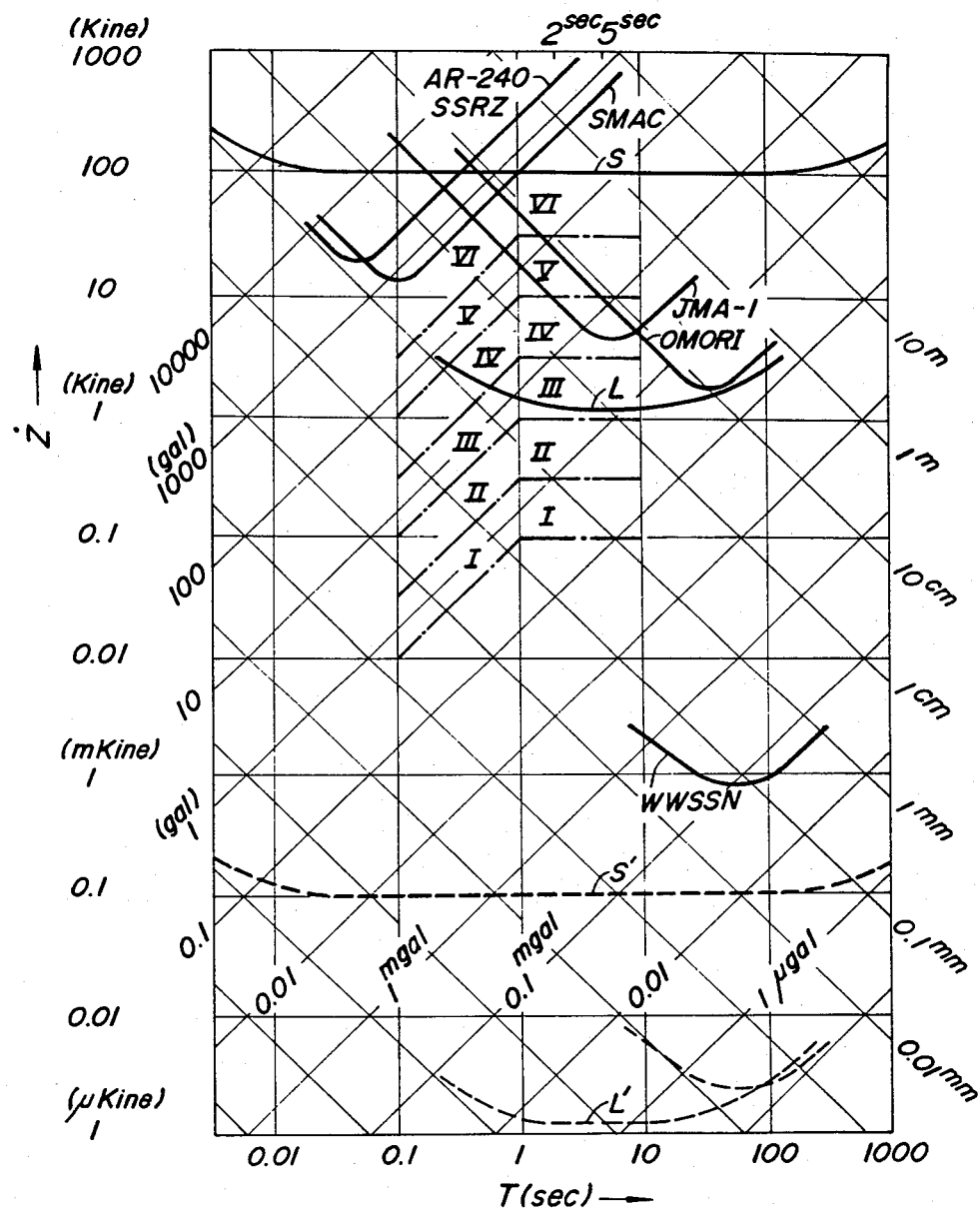
FIG. 5 is a graph showing the measurable ranges of seismographs including those seismographs which use the symmetrically-suspended vertical-swing long-period pendulum means of the invention.

For the purpose of comparison, the seismograph with the last-mentioned sensitivity characteristics and using the pendulum means of the invention is referred to as a wide range velocity type strong-motion seismograph (S), while the seismograph using the pendulum means of the invention and having the sensitivity characteristics of FIG. 4 is referred to as a long-period high-sensitivity seismograph (L). FIG. 5 is a logarithmic graph of vibrating speed vs period characteristics of seismograph. In the figure, the ordinate represents the seismic vibration velocity ż kine which corresponds to the maximum swing amplitude of the seismograph or the pendulum displacement of 1 mm at the position of a differential transformer or the displacement-voltage converter, while the abscissa represents the period thereof. The solid lines S and L represent such characteristics of the wide range velocity type strong-motion seismograph (S) and the long-period high-sensitivity seismograph (L). The dash lines S' and L' of FIG. 5 show the seismic motions which corresponds to the pendulum displacement of $10^{-6}$ mm of the above seismographs respectively.

In addition to the above seismograhs (S) and (L) using the pendulum means of the invention, FIG. 5 also shows the recordable ranges of other widely used conventional seismograph; such as the acceleration type strong-motion seismographs (types SMAC, AR-240, SSRZ), displacement type strong-motion seismographs (types JAM-1, OOMORI), and long-period high-sensitivity seismographs (WWSSN type). Besides, the seismic motion ranges for the intensity scales of earthquakes I through VI according to the Meteorological Agency of the Ministry of Transport are also indicated in FIG. 5.

As can be seen from FIG. 5, as to the long period components, several second or longer, of those ground vibrations which have an intensity in the range of above-mentioned scales IV through VI, the conventional displacement type strong-motion seismographs are all scaled out, while the conventional acceleration type strong-motion seismographs have a low accuracy of measurement. On the other hand, the wide range velocity type strong-motion seismograph (S) using the symmetrically-suspended vertical-swing long-period pendulum means of the invention is expected to record such long period components of the ground vibrations with a high accuracy. The lower limit L' of the measurable range by the long-period high-sensitivity seismograph (L) using the symmetrically-suspended vertical-swing long-period pendulum means of the invention, as shown by the dash line in FIG. 5, is substantially the same as the lower limit of the measurable range of the conventional long-period highsensitivity seismographs of WWSSN type, so that the seismograph (L) proved to be practicable as a long-period high-sensitivity seismograph. The upper limit of the measurable range of the seismograph (L) is much higher than that of the conventional WWSSN type seismographs, so that the use of the symmetrically-suspended vertical-swing long-period pendulum means of the invention is expected to fined a very wide range of applications.

As described in the foregoing, the essential point in the formation of the symmetrically-suspended vertical-swing long-period pendulum means of the invention is in that two symmetrical pendulums disposed horizontally and connected by mutually-crossing flexible wires are suspended in a symmetric manner while connecting the lower portions of the pendulums by a horizontal coiled spring. Two outstanding effects are achieved by the formation of the invention. Firstly, the connection of the two pendulums by the mutually-crossing flexible wires in the pendulum means of the invention eliminates the influence of non-vertical components of the outside vibration, which influence has been unavoidable in the conventional long-period pendulum means made of a single pendulum, so that the pendulum means of the invention can accurately measure and record long-period components of large seismic vibrations.

Secondly, as compared with the conventional Ewing type suspension of two pendulums connected by mutually-crossing flexible wires, the symmetrical suspension of the invention makes it easy to fulfil the above-mentioned long period condition, such as the condition of the equation (17), by adjusting the position of the center of gravity of the pendulums, so that the pendulum means of the invention can measure the long-period components of seismic vibrations in a stable manner. Thereby, the response of seismographs to long period components of earthquake vibrations can be improved by using the pendulum means of the invention.

With the pendulum means of the invention, it is possible to produce such a seismograph which can accurately measure and record not only strong seismic vibrations over a sufficiently wide period range, but also weak long-period components in small-scale earthquake vibrations. Especially, the improvement in the response characteristics to long-period components of seismic vibrations by the invention will facilitate production of seismographs which can accurately measure vibrations from sufficient distant parts of the world, so that the global observation of earthquakes may be carried out instead of the WWSSN type seismographs.

Although the invention has been described with a certain degree of particularity, it is understood that the present disclosure has been made only by way of example and that numerous changes in details of construction and the combination and arrangement of parts may be resorted to without departing from the scope of the invention as hereinafter claimed.

What is claimed is:

1. A symmetrically-suspended vertical-swing long-period pendulum means, comprising a pedestal, two identical sector-shaped pendulums supported by crossed leaf springs, which are the axes of rotation, extending from said pedestal at horizontally aligned two axes in a laterally symmetrical manner so that said pendulum can swing vertically on substantially one common vertical plane about said axes thereof respectively, each of said pendulums having a sector-shaped surface with a center of curvature thereof located at said axis thereof, the sector-shaped surfaces of the two pendulums disposed so as to face each other and being connected to each other by mutually-crossing flexible wires, each pendulum having a rigid extension integrally formed therewith so as to extend downward and a weight movably mounted thereon, a coiled spring connecting said rigid extensions of the two pendulums, a first adjuster means mounted on said pendulums so as to adjust the center of gravity of each pendulum by moving said weight thereof, and a second adjuster means mounted on said extensions of the pendulums so as to adjust the location of joints of said coiled spring.

* * * * *